US012576518B2

(12) United States Patent (10) Patent No.: US 12,576,518 B2

Moriyama et al. (45) Date of Patent: Mar. 17, 2026

(54) ROBOT CONTROL SYSTEM, CONTROL DEVICE, AND ROBOT CONTROL METHOD

(71) Applicant: JOHNAN Corporation, Uji (JP)

(72) Inventors: Kozo Moriyama, Kyoto (JP); Shin Kameyama, Kyoto (JP); Truong Gia Vu, Kyoto (JP); Lucas Brooks, Kyoto (JP)

(73) Assignee: JOHNAN CORPORATION, Uji (JP)

( * ) Notice: Subject to any disclaimer, the term of this patent is extended or adjusted under 35 U.S.C. 154(b) by 401 days.

(21) Appl. No.: 18/246,497

(22) PCT Filed: Mar. 4, 2022

(86) PCT No.: PCT/JP2022/009341

§ 371 (c)(1),
(2) Date: Mar. 23, 2023

(87) PCT Pub. No.: WO2022/209577

PCT Pub. Date: Oct. 6, 2022

(65) Prior Publication Data

US 2023/0356392 A1 Nov. 9, 2023

(30) Foreign Application Priority Data

Mar. 31, 2021 (JP) ................................. 2021-060229

(51) Int. Cl.
*B25J 9/16* (2006.01)
*B25J 19/02* (2006.01)

(52) U.S. Cl.
CPC ............. *B25J 9/163* (2013.01); *B25J 9/1676* (2013.01); *B25J 9/1697* (2013.01); *B25J 19/023* (2013.01)

(58) Field of Classification Search
CPC ........ B25J 19/023; B25J 9/1697; B25J 9/163; B25J 9/1676; B25J 9/02; B25J 13/089
See application file for complete search history.

(56) References Cited

U.S. PATENT DOCUMENTS 5,835,684 A * 11/1998 Bourne .................. B25J 9/1666
700/255
8,315,738 B2 * 11/2012 Chang .................... B25J 9/1666
700/255

(Continued)

FOREIGN PATENT DOCUMENTS

CN 106166750 A * 11/2016 ............ B25J 9/1666
JP 2005081445 A * 3/2005 ............ B25J 9/1666

(Continued)

OTHER PUBLICATIONS

Mahima et al., "Apparatus and Method for Controlling Robot", (JP2005103674A). (English Translation) (Year: 2005).*

(Continued)

*Primary Examiner* — Adam R Mott
*Assistant Examiner* — Abigail Lee Espinoza
(74) *Attorney, Agent, or Firm* — HSML P.C.

(57) ABSTRACT

Provided is a robot control system (1) including a robot (200) and a control device (100). The control device (100): specifies positions of other objects, specifies a second cuboid that encompasses a first cuboid containing the positions of a plurality of vertices of the robot prior to movement and the positions of a plurality of vertices of the robot after movement, and causes the robot to move if none of the other objects are within the second cuboid.

11 Claims, 6 Drawing Sheets

(56)                References Cited

U.S. PATENT DOCUMENTS

| | | | | |
|---|---|---|---|---|
| 9,283,678 | B2 * | 3/2016 | Kuffner, Jr. | ............ B25J 9/1676 |
| 2015/0314443 | A1 | 11/2015 | Yu | |
| 2018/0257232 | A1 | 9/2018 | Yamamoto et al. | |
| 2019/0039242 | A1 * | 2/2019 | Fujii | ...................... B25J 9/1666 |
| 2019/0054620 | A1 * | 2/2019 | Griffiths | ................. A61B 34/35 |
| 2019/0134815 | A1 | 5/2019 | Fujii et al. | |
| 2019/0217472 | A1 | 7/2019 | Nakasu et al. | |

FOREIGN PATENT DOCUMENTS

| | | | | |
|---|---|---|---|---|
| JP | 2005103674 | A | * | 4/2005 | |
| JP | 3797986 | B2 | * | 7/2006 | ............ B25J 9/1664 |
| JP | 2018-149627 | | | 9/2018 | |
| JP | 2019-025621 | | | 2/2019 | |
| JP | 2019-084649 | | | 6/2019 | |
| JP | 2019-123022 | | | 7/2019 | |
| WO | WO-2016022155 | A1 | * | 2/2016 | ............ B25J 9/1676 |

OTHER PUBLICATIONS

Jia et al., "An Improved D.S. Mechanical Arm Dynamic Barrier-avoiding Route Planning Method", (CN106166750A). (English Translation) (Year: 2016).*

JP-2005081445-A, English Translation (Year: 2005).*

JP-3797986-B2, English Translation (Year: 2006).*

International Search Report and Written Opinion of PCT/JP2022/009341, May 24, 2022, 8 pages including English translation of the International Search Report.

* cited by examiner

【Fig.1】
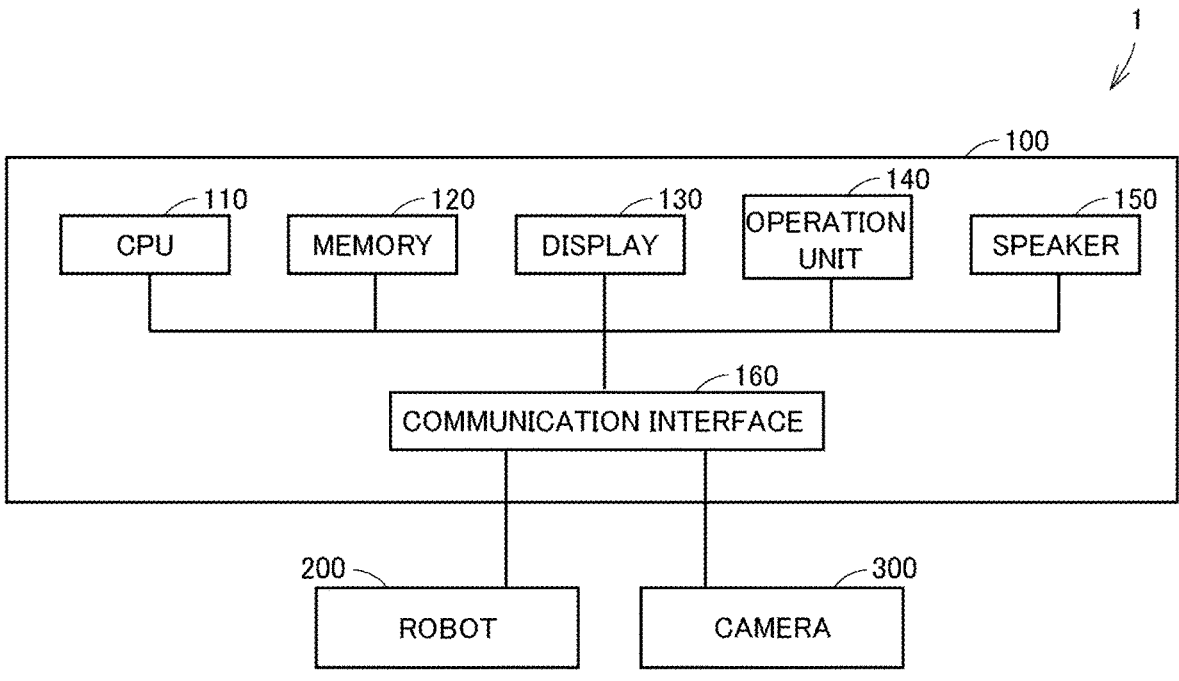

【Fig.2】
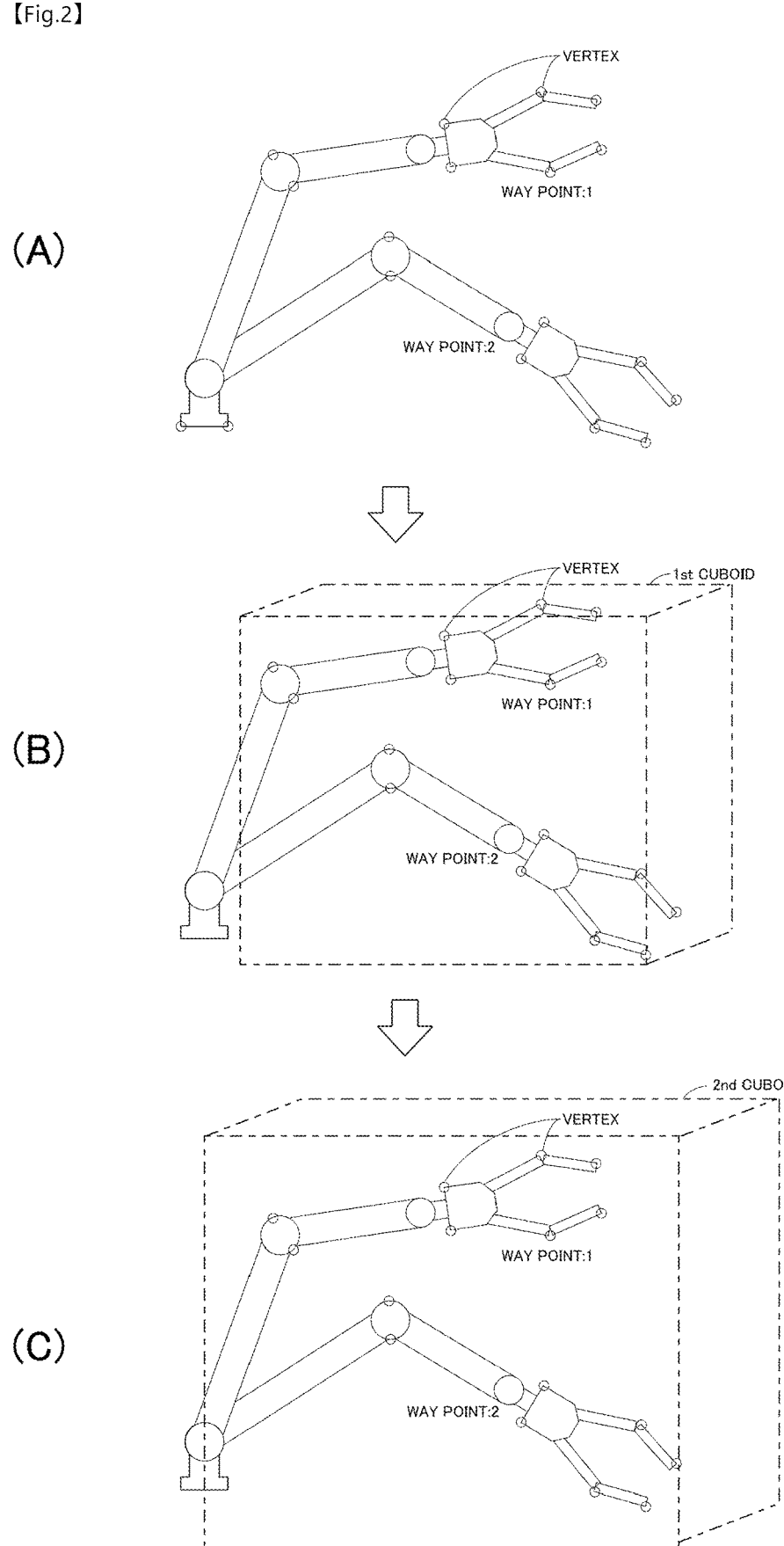

【Fig.3】
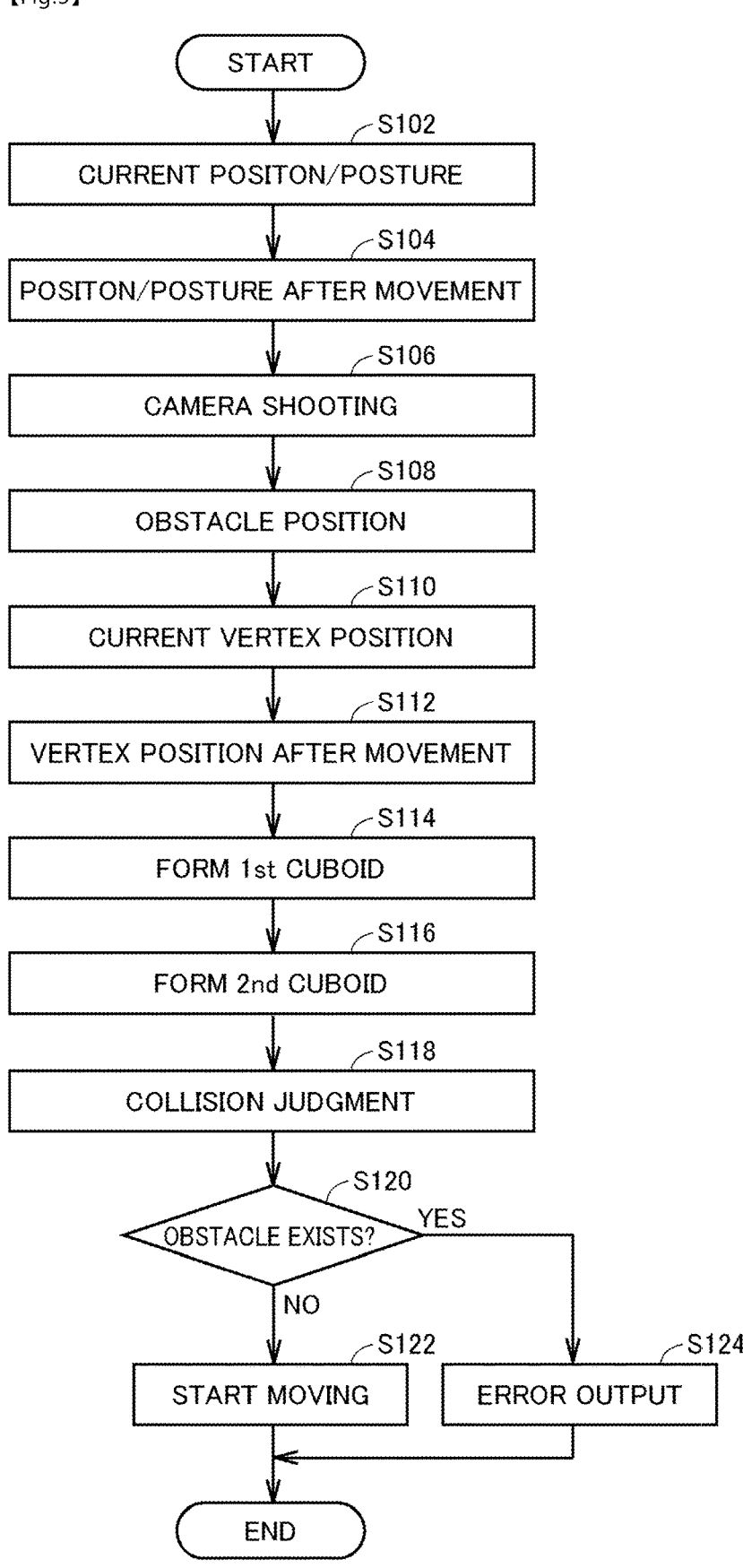

【Fig.4】
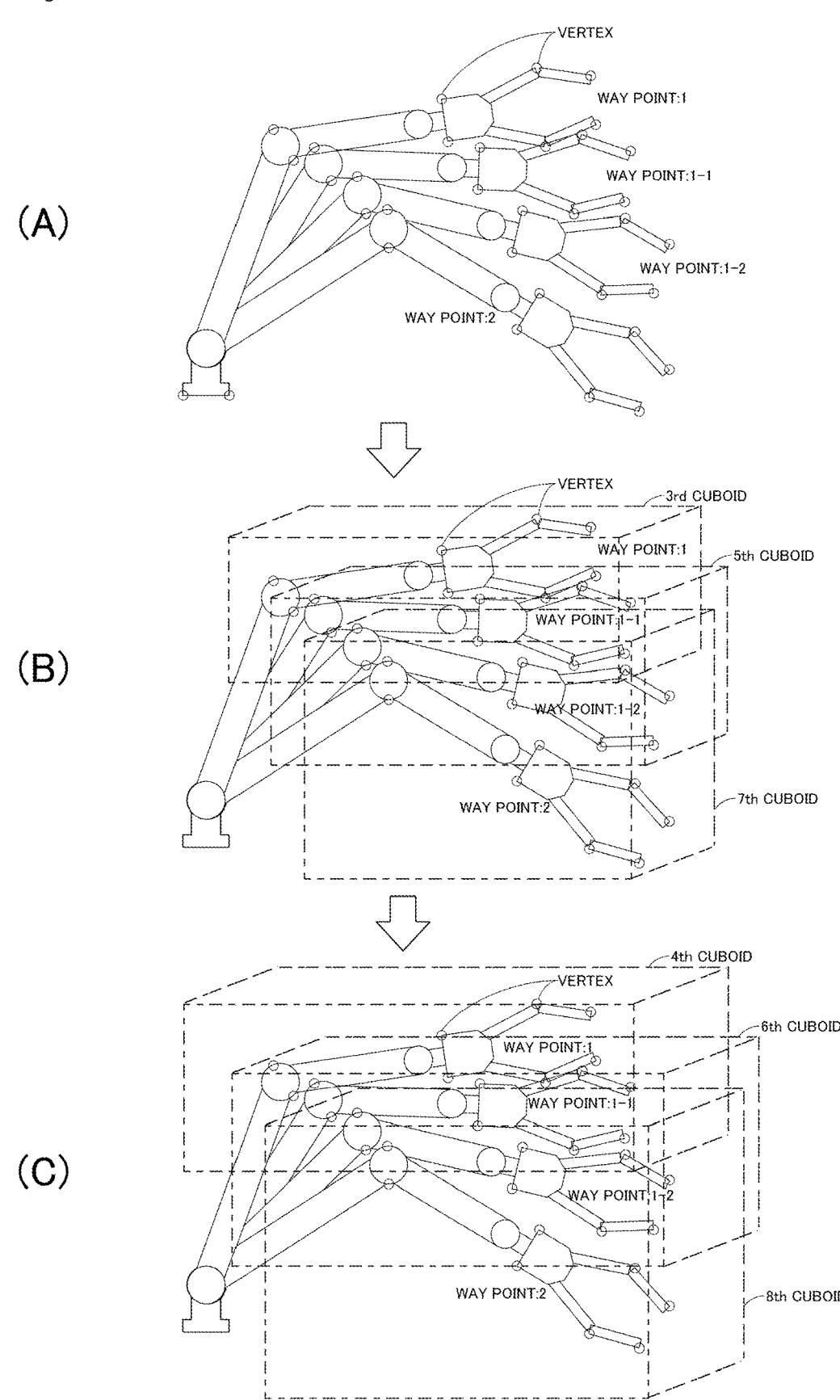

【Fig.5】
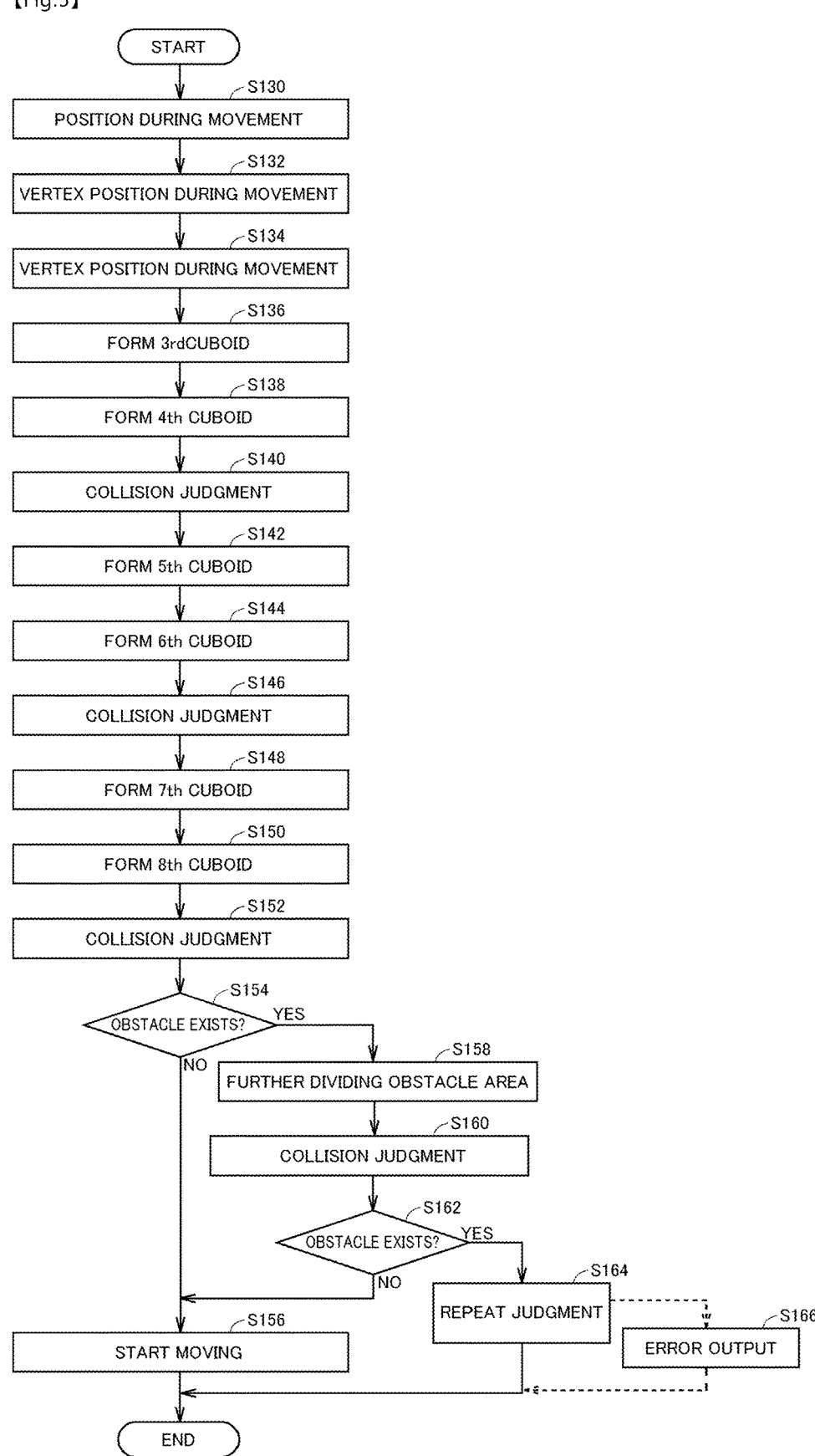

【Fig.6】
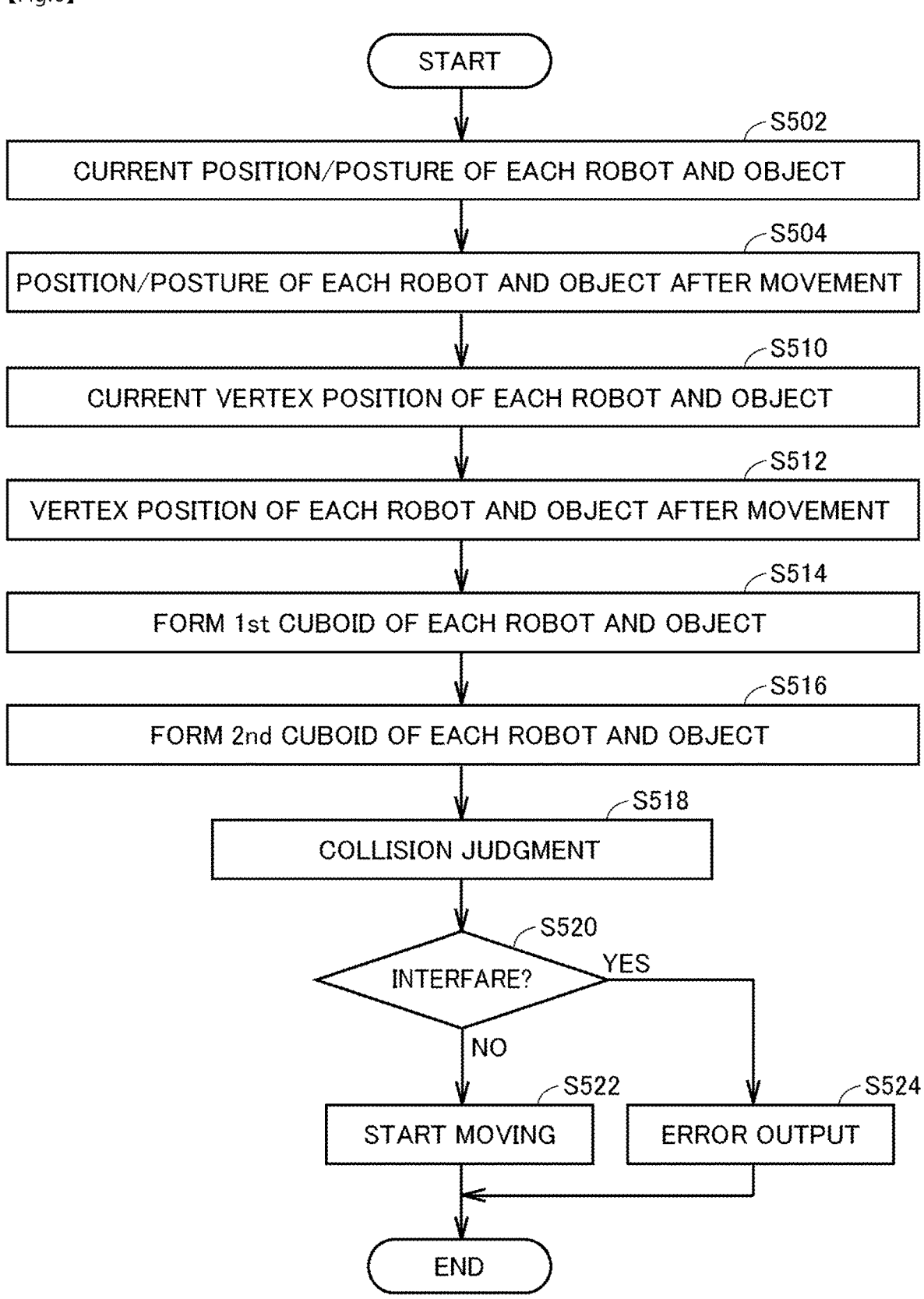

ROBOT CONTROL SYSTEM, CONTROL DEVICE, AND ROBOT CONTROL METHOD

TECHNICAL FIELD

The present invention relates to a technology for controlling various robots, and more particularly to a technology for determining whether a robot will collide with another object while moving.

BACKGROUND ART

A technology for avoiding robot collisions have been known. For example, JP-A-2019-123022 (PTL 1) discloses a robot control device and an automatic assembly system. According to PTL 1, a robot control device inputs the operating state of a worker from a sensor. Then, the robot control device calculates the position and velocity vector of each of the robot and the worker from the operating state of the robot and the operating state of the worker. The robot control device generates risk determination areas (area to stop the robot, area to retract the robot, area to slow down the robot) around each of the robot and the worker. The robot control device judges the risk from the overlap of the generated risk determination area of the robot and the generated risk determination area of the worker. The robot control device generates a collision avoidance trajectory for avoiding collision between the robot and the worker from the result of the judgement, and controls the robot based on the generated collision avoidance trajectory.

CITATION LIST

Patent Literature

PTL 1: JP-A-2019-123022

SUMMARY OF INVENTION

Technical Problem

An object of the present invention is to provide a technology for efficiently determining whether there is a collision during movement of a robot.

Solution to Problem

According to an aspect of the invention, there is provided a robot control system that includes a robot and a control device. The control device specifies positions of other objects, specifies a second cuboid that encompasses a first cuboid containing the positions of a plurality of vertices of the robot prior to movement and the positions of a plurality of vertices of the robot after movement, and causes the robot to move if the other objects are not within the second cuboid.

Advantageous Effects of Invention

As described above, according to the present invention, there is provided a technology for efficiently determining whether there is a collision during robot movement.

BRIEF DESCRIPTION OF THE DRAWINGS

FIG. 1 is a block diagram representing an overall configuration of a robot control system according to First Embodiment.

FIG. 2 is an image diagram representing a collision determination method according to First Embodiment.

FIG. 3 is a flowchart representing information processing for collision determination according to First Embodiment.

FIG. 4 is an image diagram representing a collision determination method according to Second Embodiment.

FIG. 5 is a flowchart representing information processing for collision determination according to Second Embodiment.

FIG. 6 is a flowchart representing information processing for collision determination according to Fifth Embodiment.

DESCRIPTION OF EMBODIMENTS

The following describes embodiments of the present invention with reference to the accompanying drawings. In the following descriptions, like elements are given like reference numerals. Such like elements will be referred to by the same names, and have the same functions. Accordingly, detailed descriptions of such elements will not be repeated.

First Embodiment

<Overall Configuration of the Robot Control System>

First, referring to FIG. 1, the overall configuration of a robot control system 1 according to this embodiment is described. The robot control system 1 includes, as main devices, a robot 200, a camera 300, and a control device 100 for controlling the motion of the robot 200 based on the image captured by the camera 300. The robot control system 1 is applied, for example, to a production site in a factory, and is configured to cause a robot 200 to perform a predetermined task (work) at the production site.

The control device 100 mainly includes a CPU 110, a memory 120, a display 130, an operation unit 140, a speaker 150 and a communication interface 160. The CPU 110 controls each part of the robot 200 and the control device 100 by executing programs stored in the memory 120. For example, the CPU 110 executes a program stored in the memory 120 and refers to various data to perform various types of information processing, which will be described later.

The memory 120 is implemented by various RAMs, various ROMs, and the like. The memory 120 stores programs executed by the CPU 110 and data generated by the execution of the programs by the CPU 110, such as the operating state, the current position and the target position of the robot 200.

The display 130 displays texts and images based on signals from the CPU 110.

The operation unit 140 receives instructions from the user and inputs them to the CPU 110.

The speaker 150 outputs various sounds based on signals from the CPU 110.

Note that the display 130, the operation unit 140, and the speaker 150 may be implemented by other terminals.

The communication interface 160 exchanges various data with other devices such as the robot 200 and the camera 300 via a communication cable, wireless LAN, or the like.

In this way, the CPU 110 of the control device 100, according to the robot control program in the memory 120, acquires the spatially occupied area of a workpiece to be worked on (specified by position, shape and/or size, etc.) and the spatially occupied area of an obstacle (specified by position, shape and/or size, etc.) based on the image data from the camera 300 via the communication interface 160, and outputs various commands to the robot 200 via the communication interface 160.

The base position of the robot arm is hereinafter referred to as the position of the robot 200, and the combination of angles of all the joints of the robot arm is also referred to as the posture of the robot 200.

<Overview of Robot Control System Operation>

Next, a method for determining a collision between the robot 200 and an obstacle according to the present embodiment is described with reference to FIG. 2.

In the present embodiment, referring to FIG. 2(A), the control device 100 acquires the current position and/or posture (posture: 1) of the robot 200 from the robot or the control device that controls the position and/or posture of the robot and acquires the posture after movement (posture: 2) based on the control data of the task.

The control device 100 calculates the current position of each vertex of the robot 200 based on the current posture of the robot 200 (posture: 1). Each vertex of the robot 200 is set at a projecting portion of the outer peripheral surface of the robot 200. The control device 100 calculates the position of each vertex of the robot 200 after movement based on the posture of the robot 200 after movement (posture: 2).

Referring to FIG. 2(B), the control device 100 defines a first cuboid that encompasses all of the vertices before movement and after movement.

Referring to FIG. 2(C), the control device 100 defines a second cuboid that encompasses the first cuboid. The second cuboid is a rectangular parallelepiped that encloses the first cuboid and is one size larger than the first cuboid. For example, the control device 100 defines the second cuboid that is obtained by lengthening each side of the first cuboid by the length of the moving distance of the first cuboid.

The control device 100 specifies the position of another obstacle based on the image from the camera 300 and determines whether the obstacle is present within the second cuboid. If the obstacle exists within the second cuboid, the control device 100 determines that there is a high possibility that the robot 200 will collide with the obstacle during movement, outputs a warning. If the obstacle does not exist within the cuboid, it is determined that the robot 200 is unlikely to collide with an obstacle during movement, and the movement of the robot 200 is permitted.

<Information Processing of the Control Device 100>

Next, referring to FIGS. 2 and 3, information processing of the control device 100 in the present embodiment is described in detail. The CPU 110 of the control device 100 reads out, for example, a program for the next task to be executed according to the program in the memory 120, and executes the following processing.

First, the CPU 110 acquires the current position and/or posture (posture: 1) of the robot 200 from the robot 200 (step S102).

The CPU 110 refers to the task control data in the memory 120 and acquires the post-movement posture (posture: 2) of the robot 200 (step S104).

The CPU 110 causes the camera 300 to photograph the surroundings of robot 200, and stores the photographed image in the memory 120 (step S106).

Based on the captured image, the CPU 110 identifies the presence or absence of an obstacle, the position of the obstacle, and the area occupied by the obstacle (step S108).

The CPU 110 identifies three-dimensional coordinates of a plurality of vertices of polygons representing the shape of the robot 200 based on the current posture of the robot 200 (posture: 1) (step S110). For example, the position coordinates of protruding portions on the outer peripheral surface of the robot 200, such as the position (XT1, YT1, ZT1) of the vertex T of the top end of the robot 200 and the position of the vertex R (XR1, YR1, ZR1) of the left end of the robot 200, are identified.

The CPU 110 identifies the three-dimensional positions of the vertices of the robot 200 based on the posture of the robot 200 after movement (posture: 2) (step S112). For example, the position coordinates of protruding portions on the outer peripheral surface of the robot 200, such as the position (XT2, YT2, ZT2) of the vertex T of the top end of the robot 200 and the position of the vertex R (XR2, YR2, ZR2) of the left end of the robot 200, are identified.

The CPU 110 forms a first cuboid containing all vertices of the current posture (posture: 1) of the robot 200 and all vertices of the post-movement posture (posture: 2) of the robot 200 (step S114).

The CPU 110 forms a second cuboid containing the first cuboid with a buffer. In this embodiment, the CPU 110 calculates the distance between the current posture (posture: 1) and the post-movement posture (posture: 2) for each vertex of the robot 200, and selects the longest distance. The CPU 110 forms a second cuboid by lengthening each side of the first cuboid by the distance (step S116).

The CPU 110 determines whether an obstacle exists inside the second cuboid (step S118).

If no obstacle exists inside the second cuboid (NO in step S120), the CPU 110 causes the robot 200 to start moving (step S122).

If there is an obstacle inside the second cuboid (YES in step S120), the CPU 110 stops the movement of the robot 200 and sends error information to another device or the like via the communication interface 160 (step S124). The CPU 110 may output error information from the display 130 or the speaker 150.

Second Embodiment

In the above embodiment, based on the second cuboid encompassing the first cuboid containing the vertices of the current position and/or posture (posture: 1) of the robot 200 and the vertices of the post-movement posture (posture: 2) of the robot 200, it is determined whether the robot 200 will collide with an obstacle. In addition, in this embodiment, even if it is determined that an obstacle exists within the second cuboid, it is determined again whether the robot 200 will collide with an obstacle based on a cuboid or the like, which is based on the vertices of the current position (posture: 1) and the vertices of the robot during movement or based on the vertices of the robot during movement and the vertices of the post-movement position (posture: 2).

First, referring to FIG. 4(A), in the present embodiment, the control device 100 calculates the current position of each vertex of the robot 200, the position of each vertex during movement, and the position of each vertex after movement based on the current posture of the robot 200 (posture: 1), the posture during movement of the robot 200 (posture: 1-1), the posture during movement of the robot 200 (posture: 1-2), and the posture after movement (posture: 2).

Referring to FIG. 4(B), the control device 100 defines a third cuboid that contains all of the current vertices of the robot 200 and the vertices of the robot 200 during movement. The control device 100 defines a fifth cuboid that contains all of the vertices of the robot 200 during movement and the vertices of the robot 200 during movement. The control device 100 defines a seventh cuboid that contains all the vertices of the robot 200 during movement and the vertices of the robot 200 after movement.

Referring to FIG. 4(C), the control device 100 defines a fourth cuboid that encompasses the third cuboid, defines a sixth cuboid that encompasses the fifth cuboid, and defines an eighth cuboid that encompasses the seventh cuboid. The 4th, 6th, and 8th cuboids are respectively a rectangular parallelepiped that encloses the 3rd, 5th, and 7th cuboid and are one size larger than the 3rd, 5th, and 7th cuboid.

Then, based on the image from the camera 300, the control device 100 locate another obstacle and determines whether the obstacle exists within the 4th, 6th, and 8th cuboids. If the obstacle does not exist inside any of the 4th, 6th, and 8th cuboids, the control device 100 determines that the possibility of collision is low and permits the movement of the robot 200. If the obstacle exists inside any of the 4th, 6th and 8th cuboids, the control device 100 determines that the robot 200 is highly likely to collide with the obstacle during movement, and stops movement and notifies other systems of the fact.

The following describes the process when the obstacle exists in the 2nd cuboid, i.e., the process when it is YES in step S120 of FIG. 3. The CPU 110 executes the following processes according to the program in memory 120.

Referring to FIG. 4 and FIG. 5, the CPU 110 identifies the first posture (posture: 1-1) and the second posture (posture: 1-2) during movement of the robot 200 as a position or timing between the current position (posture: 1) and the post-movement position (posture: 2) of the robot 200 (step S130).

The CPU 110 calculates the position of each vertex of the robot 200 based on the first posture (posture: 1-1) during movement of the robot 200 (step S132).

The CPU 110 calculates the position of each vertex of the robot 200 based on the second posture (posture: 1-2) during movement of the robot 200 (step S134).

The CPU 110 forms a third cuboid encompassing all vertices of the current posture (posture: 1) of the robot 200 and all vertices of the first position (posture: 1-1) during the movement of the robot 200 (step S136).

The CPU 110 defines a fourth cuboid that encompasses the third cuboid (step S138). The fourth cuboid is a rectangular parallelepiped that encloses the third cuboid and is one size larger than the third cuboid. For example, the CPU 110 defines the fourth cuboid that is obtained by lengthening each side of the third cuboid by the longest distance from the current position (posture: 1) to the first position (posture: 1-1).

The CPU 110 specifies the position of another obstacle based on the image from the camera 300 and determines whether the obstacle exists within the fourth cuboid (step S140).

The CPU 110 defines the fifth cuboid that contains all the vertices of the first position (posture: 1-1) during movement of the robot 200 and all the vertices of the second position (posture: 1-2) during movement of the robot 200 (step S142).

The CPU 110 defines a sixth cuboid that encompasses the fifth cuboid (step S144). The sixth cuboid is a cuboid that encloses the fifth cuboid and is one size larger than the fifth cuboid.

The CPU 110 specifies the position of another obstacle based on the image from the camera 300, and determines whether the obstacle exists within the sixth cuboid (step S146).

The CPU 110 defines a seventh cuboid that includes all the vertices of the second position (posture: 1-2) during movement of the robot 200 and all the vertices of the post-movement position (posture: 2) of the robot 200 (step S148).

The CPU 110 defines an eighth cuboid that encompasses the seventh cuboid (step S150). The eighth cuboid is a cuboid that encloses the seventh cuboid and is one size larger than the seventh cuboid.

The CPU 110 specifies the position of another obstacle based on the image from the camera 300, and determines whether the obstacle exists within the eighth cuboid (step S152).

In case that an obstacle does not exist within the fourth cuboid, an obstacle does not exist within the sixth cuboid, and an obstacle does not exist within the eighth cuboid (NO in step S154), the CPU 110 determines that the robot 200 is unlikely to collide with an obstacle, and the movement of the robot 200 is permitted (step S156).

If an obstacle exists within the fourth cuboid (YES in step S154), the CPU 110 defines another cuboid by further dividing a state between the current position (posture: 1) and the first position (posture: 1-1) during movement (step S158), and the CPU110 determines whether an obstacle exists within the another cuboid (step S160).

If the obstacle exists within the sixth cuboid (YES in step S154), the CPU 110 defines another cuboid by further dividing a state between the first position (posture: 1-1) during movement and the second position (posture: 1-2) during movement (step S158), and the CPU110 determines whether an obstacle exists within the another cuboid (step S160).

If the obstacle exists within the eighth cuboid (YES in step S154), the CPU 110 defines another cuboid by further dividing a state between the second position (posture: 1-2) during movement and the post-movement position (posture: 2) (step S158), and the CPU110 determines whether an obstacle exists within the another cuboid (step S160).

In this way, when it is determined that no obstacle exists within any of the cuboid (YES in step S160), the CPU 110 determines that the robot 200 is unlikely to collide with an obstacle, and the movement of the robot 200 is permitted (step S156).

Conversely, for the cuboid determined to collide, the CPU 110 repeats the collision determination while dividing the corresponding moving route (step S164). The CPU 110 performs processing such as stopping movement and notifying other systems (step S166) if the possibility of colliding with an obstacle remains even after a predetermined stage of division.

In addition, as a termination condition of the division process, the upper limit of the number of divisions can be set. Alternatively, the division process may be terminated when the movement distance of each joint (the maximum value of which) and each joint angle (the maximum value of which) between before and after movement become equal to or less than a certain threshold value.

In this embodiment, the moving route between the current position (posture: 1) and the post-movement position (posture: 2) is divided at two points or timings, that is, the moving route is divided at the first position during movement (posture: 1-1) and the second position during movement (posture: 1-2). But it may be divided at one point or timing, or may be divided at three or more points or timings.

Alternatively, the posture and the moving route may be divided so that the movement distance is within a predetermined movement distance, and the collision determination may be performed sequentially. Specifically, when moving the robot from the posture 1 to the posture 2, the moving route may be divided in advance by predetermined units (for example, postures 1.1, 1.2, 1.3 . . . 1.9 are created in advance before collision confirmation) and the control device may cause the robot to move to posture 2 while judging collisions at postures 1.1, 1.2, and 1.3 as the robot moves.

Third Embodiment

In the above embodiment, the control device 100 extends the length of each side of the 1st, 3rd, 5th, and 7th cuboids based on the movement distance of the longest of the moving distances of each vertex to define the 2nd, 4th, 6th and 8th cuboids. However, the method of providing buffers around the 1st, 3rd, 5th, and 7th cuboids is not particularly limited.

For example, the CPU 110 of the control device 100 may extends the length of each side of the 1st, 3rd, 5th, and 7th cuboids based on the movement distance of any vertex of the tip of the robot 200 to define the 2nd, 4th, 6th and 8th cuboids.

Alternatively, the CPU 110 of the control device 100 may extends the 1st, 3rd, 5th, and 7th cuboids according to the rotation angle of the robot 200 by a predetermined ratio in the positive or negative direction of the X axis, by a predetermined ratio in the positive or negative direction of the Y axis, and by a predetermined ratio in the positive or negative direction of the Z axis to define the 2nd, 4th, 6th and 8th cuboids.

Fourth Embodiment

In the above embodiment, the camera 300 is used to specify the existence, position, and area of other objects. However, the method of specifying the position and area of other objects is not limited to the above method. For example, it is not limited to the form using the camera 300. The memory 120 may register the position and posture of each component, tool, and other robots regarding the task currently being executed.

In this case, the CPU 110 acquires from the memory 120 the positions, postures, and areas in which each component, tool, and robot exist in step S108. Alternatively, in step S406, the CPU 110 acquires the position, postures, and area of each component, tool, or robot from another device such as a robot via the communication interface 160. Then, the CPU 110 determines whether each component, tool, or robot exists inside the second cuboid (step S118).

Of course, the CPU 110 may specify the position of other objects based on data from memory 120 or another device while specifying the position of other objects from the image of camera 300.

Fifth Embodiment

Furthermore, other objects or obstacles may move or change their posture. For example, the robot control system 1 may include a plurality of the robots 200, 200, . . . . More specifically, in the present embodiment, the CPU 110 of the control device 100 reads a program for a task to be executed next, for example, according to the program in the memory 120, and executes the processing shown in FIG. 6.

First, the CPU 110 acquires the current position and/or posture (posture: 1) of the first robot 200 from the first robot 200 (step S502).

The CPU 110 refers to the task control data in the memory 120 and acquires the post-movement position and posture (posture: 2) of the first robot 200 (step S504).

Based on the current position and posture (posture: 1) of first robot 200, the CPU 110 identifies three-dimensional coordinates of a plurality of vertices of polygons representing the shape of first robot 200 (step S510).

The CPU 110 specifies the three-dimensional positions of a plurality of vertices of the robot 200 based on the post-movement position and posture (posture: 2) of the second robot 200 (step S512).

The CPU 110 forms a first cuboid that includes all vertices of the current posture (posture: 1) of the first robot 200 and all vertices of the post-movement posture (posture: 2) of the first robot 200 (step S514).

The CPU 110 forms a second cuboid that encompasses the first cuboid with a buffer (step S516).

In this embodiment, this process is also performed for the second robot 200 and the third robot 200 (steps S502 to S516).

The CPU 110 determines whether the second cuboids of their robots interfere with each other (step S518).

If the second cuboids of each robot do not interfere with each other (NO in step S520), the CPU 110 causes the robots 200 to start moving (step S522).

If the second cuboids of each robot interfere with each other (YES in step S420), the CPU 110 stops the movement of the robots 200 and sends error information to other devices or the like via the communication interface 160 (step S424). The CPU 110 may output error information from the display 130 or the speaker 150.

As in the second embodiment, when the second cuboids of the respective robots interfere with each other (YES in step S420), the CPU 110 forms the third, fifth and seventh cuboids based on the vertices during movement for the respective robots, as shown in FIG. 5 (step S136, step S142, step S148). The CPU 110 forms the fourth, sixth and eighth cuboids encompassing them (step S138, step S144, step S150). The CPU 110 determines whether the third cuboids of the respective robots interfere with each other (step S140), determines whether the fifth cuboids of the respective robots interfere with each other (step S146), and determines whether the seventh cuboids of the respective robots interfere with each other (step S152). When the fourth, sixth and eighth cuboids of the respective robots do not interfere with each other (NO in step S154), the CPU 110 causes the robots 200 to start moving (step S156).

When the fourth, sixth, and eighth cuboids of the respective robots interfere with each other (YES in step S154), the CPU 110 further forms cuboids based on the vertices during movement for the interfering cuboids and repeatedly determines whether the cuboids interfere with each other (after step S158).

Sixth Embodiment

Other devices may perform a part or all of the role of each device such as the control device 100 and the robot 200 of the robot control system 1 of the above embodiment. For example, the role of the control device 100 may be partially played by the robot 200, the role of the control device 100 may be played by a plurality of personal computers, or the information processing of the control device 100 may be performed by a server on the cloud.

<Review>

In the above embodiments, a robot control system is provided that includes a robot and a control device. The control device specifies positions of other objects, specifies a second cuboid that encompasses a first cuboid containing the positions of a plurality of vertices of the robot prior to movement and the positions of a plurality of vertices of the robot after movement, and causes the robot to move if there are no other objects within the second cuboid.

Preferably, when any other objects are within the second cuboid, the control device specifies a fourth cuboid that encompasses a third cuboid containing the positions of a plurality of vertices of the robot prior to movement and the positions of a plurality of vertices of the robot during movement, specifies a sixth cuboid that encompasses a fifth cuboid containing the positions of a plurality of vertices of the robot during movement and the positions of a plurality of vertices of the robot after movement, and causes the robot to move when any other objects are neither in the fourth cuboid nor in the sixth cuboid.

Preferably, when any other objects are within the fourth cuboid, the control device forms a cuboid related to the vertices obtained by further dividing a state between the positions of the vertices of the robot prior to movement and the positions of the vertices of the robot during movement, and permit the robot to move if there are not any other objects within the formed cuboid, and when any other objects are within the sixth cuboid, the control device further forms a cuboid related to the vertices obtained by further dividing a state between the positions of the vertices of the robot during movement and the positions of the vertices of the robot after movement, and permit the robot to move if there are not any of the other objects within the formed cuboid.

Preferably, when any of the other objects are within the cuboid after being divided a predetermined number of times, the control device outputs predetermined information without moving the robot.

Preferably, the other object is the second robot. The control device specifies the position of the other object by obtaining the position of the second robot.

Preferably, the robot control system further includes a camera. The control device locates the other object based on the images from the camera.

In the above embodiments, a control device is provided that includes a communication interface for communicating with a robot, a memory, and a processor. The processor specifies positions of other objects, specifies a second cuboid that encompasses a first cuboid containing the positions of a plurality of vertices of the robot prior to movement and the positions of a plurality of vertices of the robot after movement, and causes the robot to move if there are not the other objects within the second cuboid.

In the above embodiment, a method for controlling a robot is provided, including the steps of specifying positions of other objects by a control device;

specifying a second cuboid that encompasses a first cuboid containing the positions of a plurality of vertices of a robot prior to movement and the positions of a plurality of vertices of the robot after movement; and causing the robot to move if there are not any other objects within the second cuboid.

It should be considered that the embodiments disclosed this time are illustrative in all respects and not restrictive. The scope of the present invention is indicated by the scope of the claims rather than the above description, and is intended to include all modifications within the scope and meaning equivalent to the scope of the claims.

REFERENCE SIGNS LIST

1: robot control system
100: control device

110: CPU
120: memory
130: display
140: operation unit
150: speaker
160: communication interface
200: robot
300: camera

The invention claimed is:

1. A robot control system, comprising:
a robot; and
a control device configured to:
    specify areas occupied by other objects in a space,
    specify a single first cuboid that contains positions of a plurality of vertices of the robot prior to movement and positions of the plurality of vertices of the robot after movement,
    specify a second cuboid that is predeterminedly larger than the single first cuboid and encompasses the single first cuboid, and
    cause the robot to move if none of the other objects is within the second cuboid.

2. The robot control system according to claim 1, wherein the control device is further configured to, when any of the other objects are within the second cuboid:
specify a fourth cuboid that encompasses a third cuboid containing the positions of the plurality of vertices of the robot prior to movement and the positions of plurality of vertices of the robot during movement,
specify a sixth cuboid that encompasses a fifth cuboid containing the positions of the plurality of vertices of the robot during movement and the positions of the plurality of vertices of the robot after movement, and
cause the robot to move when none of the other objects is in the fourth cuboid or in the sixth cuboid.

3. The robot control system according to claim 2,
wherein the control device is further configured to, when none of the other objects is within the fourth cuboid;
form a seventh cuboid related to the vertices obtained by further dividing a state between the positions of the plurality of vertices of the robot prior to movement and the positions of the plurality of vertices of the robot during movement, and
permit the robot to move if none of the other objects is within the formed seventh cuboid, and
wherein the control device is further configured to, when any of the other objects are within the sixth cuboid;
form an eighth cuboid related to the vertices obtained by further dividing a state between the positions of the plurality of vertices of the robot during movement and the positions of the plurality of vertices of the robot after movement, and
permit the robot to move if none of the other objects is within the formed eighth cuboid.

4. The robot control system according to claim 3, wherein the control device is further configured to, when any of the other objects are within the formed seventh or eighth cuboid after being divided a predetermined number of times:
output predetermined information without moving the robot.

5. The robot control system according to claim 1, wherein the other object is a second robot, and
the areas occupied in the space is the second cuboid that encompasses the first cuboid containing the positions of a plurality of vertices of the second robot prior to movement and the positions of a plurality of vertices of the second robot after movement.

6. The robot control system according to claim 1, further comprising a camera, wherein the control device is further configured to specify the positions of the other objects based on an image from the camera.

7. The robot control system of claim 1, wherein the control device is further configured to:

calculate a distance between each of the plurality of vertices of the robot prior to the movement and after movement; and select a largest distance from the calculated distances, wherein the second cuboid that is predeterminedly larger than the single first cuboid is larger than the single first cuboid by the largest distance on each side of the single first cuboid.

8. A control device, comprising:

a communication interface for communicating with a robot;

a memory; and a processor configured to:

specify positions of other objects, specify a single first cuboid that contains positions of a plurality of vertices of the robot prior to movement and positions of the plurality of vertices of the robot after movement, specify a second cuboid that is predeterminedly larger than the single first cuboid and encompasses the single first cuboid, and cause the robot to move if none of the other object is within the second cuboid.

9. The control device of claim 8, wherein the processor is further configured to:

calculate a distance between each of the plurality of vertices of the robot prior to the movement and after movement; and select a largest distance from the calculated distances wherein the second cuboid that is predeterminedly larger than the single first cuboid is larger than the single first cuboid by the largest distance on each side of the single first cuboid.

10. A robot control method, comprising:

specifying positions of other objects by a control device;

specifying a single first cuboid that contains positions of a plurality of vertices of a robot prior to movement and positions of the plurality of vertices of the robot after movement;

specifying a second cuboid that is predeterminedly larger than the single first cuboid and encompasses the single first cuboid; and causing the robot to move if none of the other objects is within the second cuboid.

11. The robot control method of claim 10, further comprising:

calculating a distance between each of the plurality of vertices of the robot prior to the movement and after movement; and selecting a largest distance from the calculated distances, wherein the second cuboid that is predeterminedly larger than the single first cuboid is larger than the single first cuboid by the largest distance on each side of the single first cuboid.

* * * * *